US007626562B2

(12) United States Patent  
Iwasaki

(10) Patent No.: US 7,626,562 B2  
(45) Date of Patent: Dec. 1, 2009

(54) IMAGE DISPLAY APPARATUS AND METHOD

(75) Inventor: Masanori Iwasaki, Kanagawa (JP)

(73) Assignee: Sony Corporation (JP)

( * ) Notice: Subject to any disclaimer, the term of this patent is extended or adjusted under 35 U.S.C. 154(b) by 790 days.

(21) Appl. No.: 11/388,890

(22) Filed: Mar. 24, 2006

(65) Prior Publication Data

US 2006/0227067 A1     Oct. 12, 2006

(30) Foreign Application Priority Data

Apr. 7, 2005   (JP) .............................. 2005-111057

(51) Int. Cl.
  *G09G 5/00*     (2006.01)
  *G02F 1/1335*   (2006.01)
(52) U.S. Cl. .................. 345/8; 345/7; 349/11
(58) Field of Classification Search .............. 345/7–9; 359/13, 618–633, 642–665; 349/11, 13–15
  See application file for complete search history.

(56) References Cited

U.S. PATENT DOCUMENTS 4,871,247 A * 10/1989 Haynes ...................... 351/219

5,682,210 A * 10/1997 Weirich ...................... 348/739
6,215,593 B1 * 4/2001 Bruce ......................... 359/619
7,202,852 B2 * 4/2007 Harvie ......................... 345/8

FOREIGN PATENT DOCUMENTS

JP       2000196975 A     7/2000

* cited by examiner

*Primary Examiner*—David L Lewis
(74) *Attorney, Agent, or Firm*—Lerner, David, Littenberg, Krumholz & Mentlik, LLP

(57) ABSTRACT

An image display apparatus attachable to an eyeball includes: a display unit including on a curved surface a plurality of display areas for displaying images; a lens array unit integrated with the display unit, the lens array unit having lenses corresponding to the respective display areas, each lens allowing light rays of an image in the corresponding display area to pass through; a lubricating member formed on the display unit such that the lubricating member and the lens array unit are arranged on opposite sides of the display unit, the lubricating member permitting eyelids in contact with the apparatus to smoothly move; and a protecting member formed on the lens array unit such that the protecting member and the display unit are arranged on opposite sides of the lens array unit, the protecting member being made of a light-transmissive material for protecting an eyeball in contact with the apparatus.

9 Claims, 19 Drawing Sheets

IMAGE DISPLAY APPARATUS AND METHOD

CROSS REFERENCES TO RELATED APPLICATIONS

The present invention contains subject matters related to Japanese Patent Application JP 2005-111057 filed in the Japanese Patent Office on Apr. 7, 2005, the entire contents of which are incorporated herein by reference.

BACKGROUND OF THE INVENTION

The present invention relates to image display apparatuses and methods and, more particularly, to an ultra thin image display apparatus and an image display method for the apparatus.

Recent television sets have tended to increase in screen size. The increase in screen size leads to the requirement of a space larger than the screen size. In the case of a television set with a screen size over, e.g., 32 inches, its horizontal effective display area is longer than 70 cm. The larger the screen size of a television set is, the heavier the weight thereof is. The weight of a liquid-crystal, plasma, or rear-projection television set is lighter than that of a CRT television set. However, the weight of a lighter television set is about several tens of kilograms.

Japanese Unexamined Patent Application Publication No. 2000-196975 discloses an image display apparatus, such as a head mounted display. In the head mounted display, a virtual-image optical system displays an image. Accordingly, an actual display unit can be miniaturized. A small image displayed in the miniaturized display unit is enlarged, thus realizing a large screen.

SUMMARY OF THE INVENTION

The head mounted display includes a lens for generating a virtual image of the image in addition to the display unit for displaying an image. The display unit and the lens have to be spaced at a certain distance. Unfortunately, the thickness of the head mounted display increases.

The present invention is made in consideration of the above problem. It is desirable to realize an ultra thin image display apparatus.

According to an embodiment of the present invention, there is provided an image display apparatus attachable to an eyeball. The apparatus includes a display unit, a lens array unit, a lubricating member, and a protecting member. The display unit includes a plurality of display areas for displaying images, the display areas being arranged on a curved surface. The lens array unit is integrated with the display unit. The lens array unit includes lenses corresponding to the respective display areas. Each lens allows light rays of an image in the corresponding display area to pass through. The lubricating member is formed on the display unit such that the lubricating member and the lens array unit are arranged on opposite sides of the display unit. The lubricating member permits eyelids in contact with the image display apparatus to smoothly move. The protecting member is formed on the lens array unit such that the protecting member and the display unit are arranged on opposite sides of the lens array unit. The protecting member is made of a light-transmissive material for protecting the eyeball in contact with the image display apparatus.

According to another embodiment of the present invention, there is provided a method for displaying images in an image display apparatus including a display unit having a plurality of display areas integrally formed and arranged on a curved surface and a lens array unit integrated with the display unit, the lens array unit having lenses arranged so as to correspond to the respective display areas, the image display apparatus being attachable to an eyeball of a user. The method includes the steps of displaying images in the display areas and applying light rays of the image in each display area through the corresponding lens to the eyeball.

According to the embodiment of the present invention, light rays of images displayed in the display areas are applied through the corresponding lenses to an eyeball.

According to the embodiment of the present invention, an ultra thin image display apparatus capable of displaying images can be realized.

DETAILED DESCRIPTION

Figure 1:
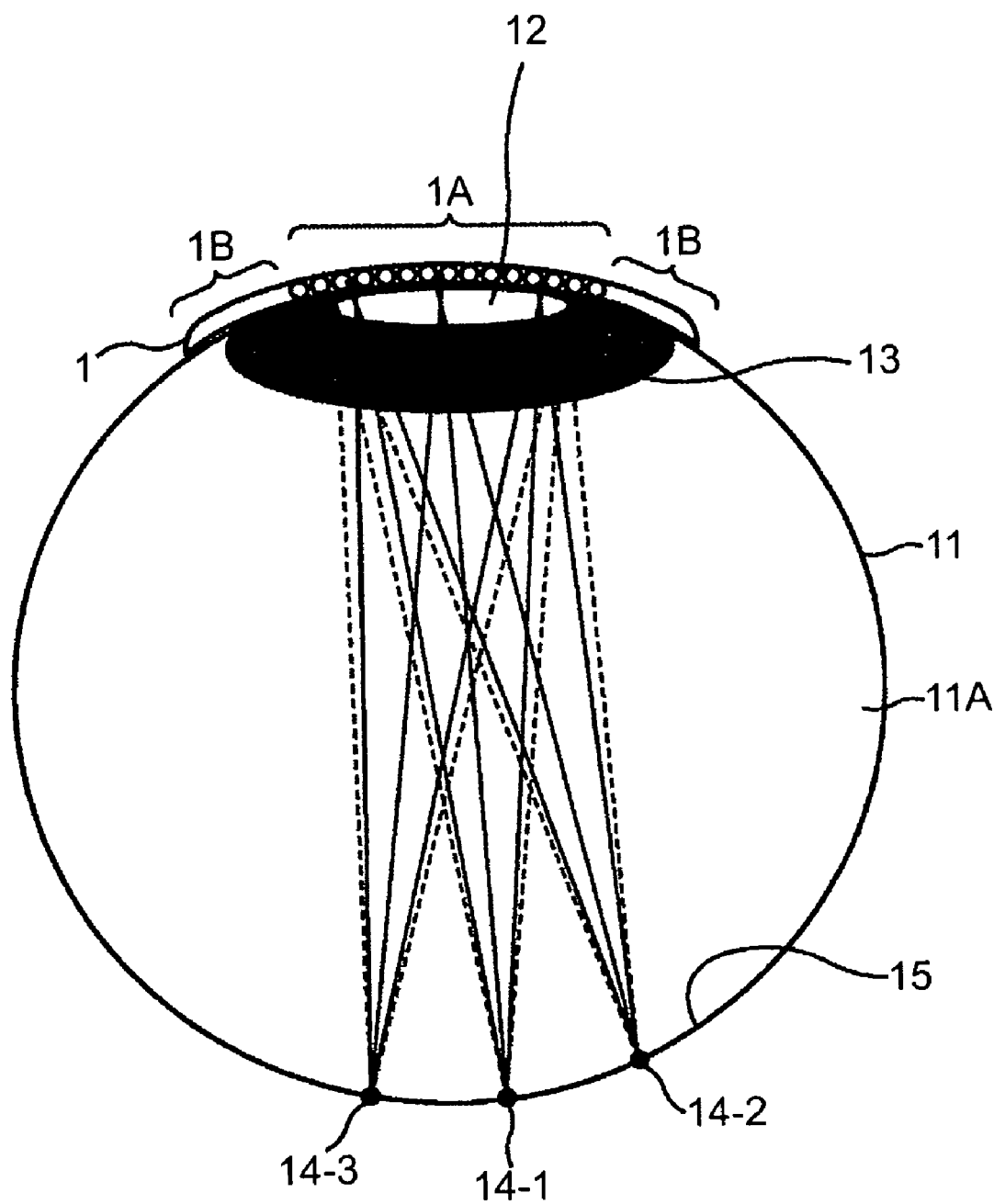
FIG. 1 is a diagram showing a usage state of an image display apparatus according to an embodiment of the present invention.
Figure 2:
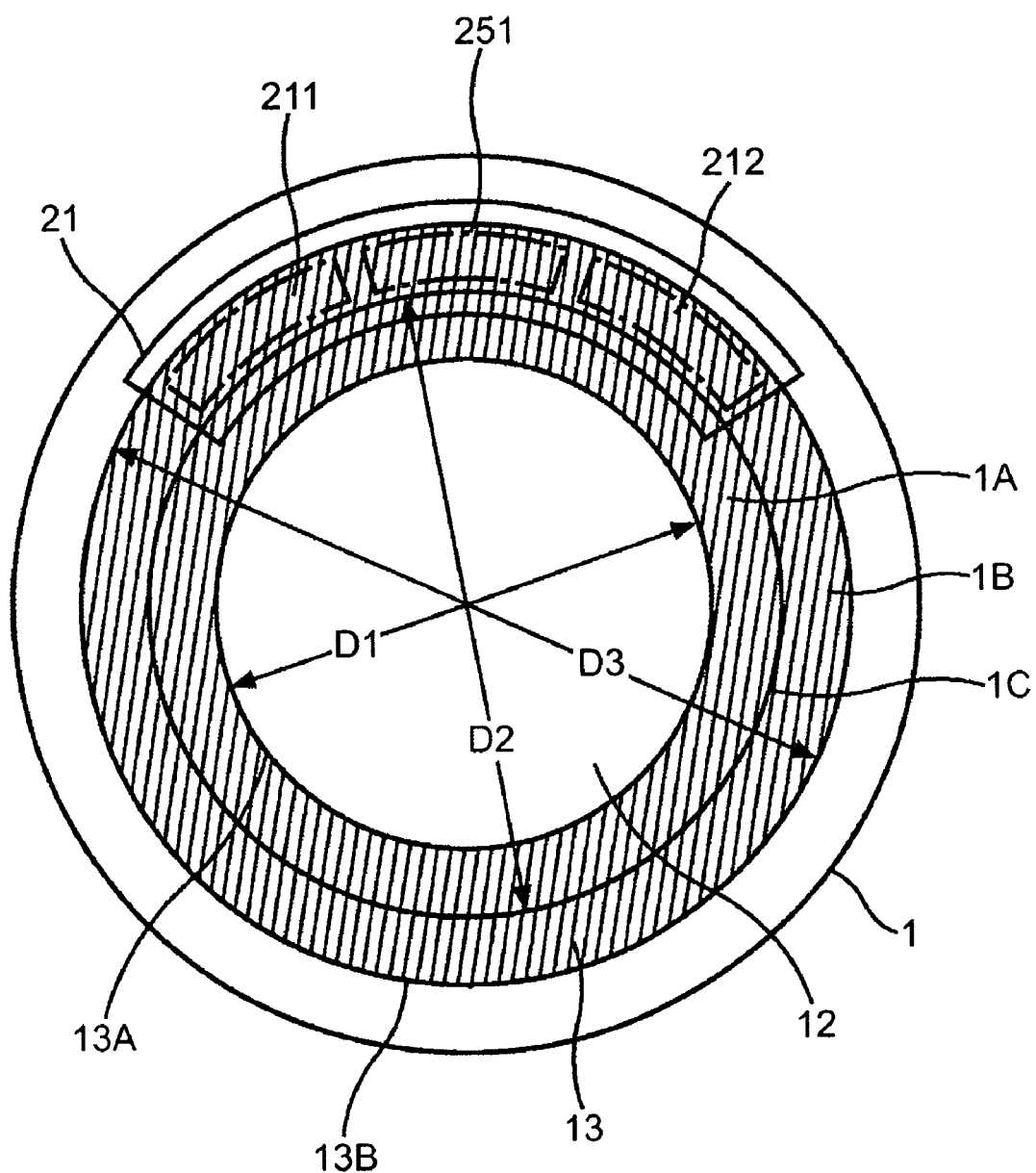
FIG. 2 is a plan view of the structure of a display unit.
Figure 3:
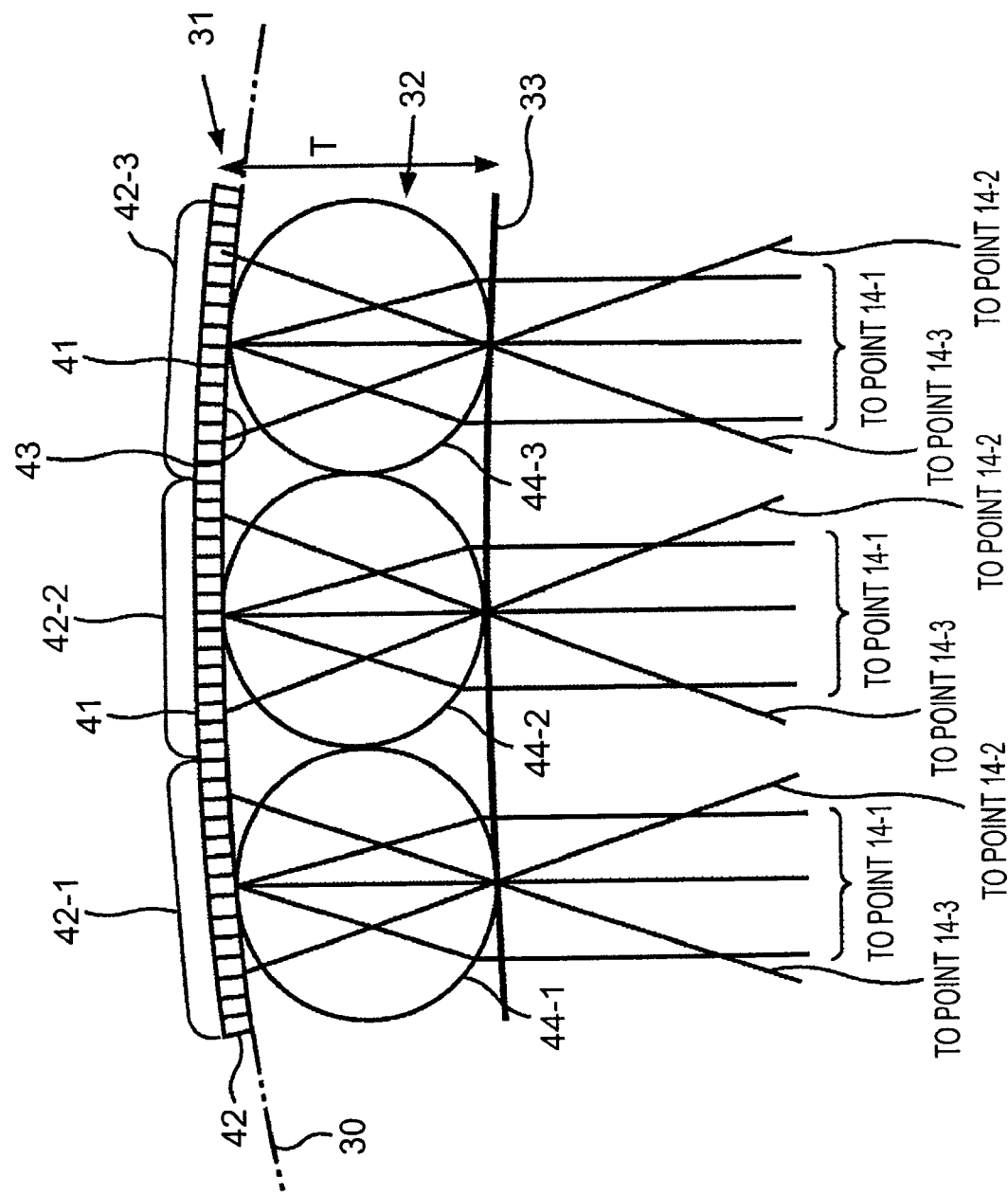
FIG. 3 is a sectional view of the structure of the display unit.

FIGS. 1 to 3 show an embodiment of an image display apparatus according to the present invention. An image display apparatus 1 includes a display unit 31 and a lens array unit 32 (refer to FIG. 3). The display unit 31 is integrated with the lens array unit 32 into one piece so that the piece is wearable on an eye 11 like a contact lens (see FIG. 1).

Figure 4:
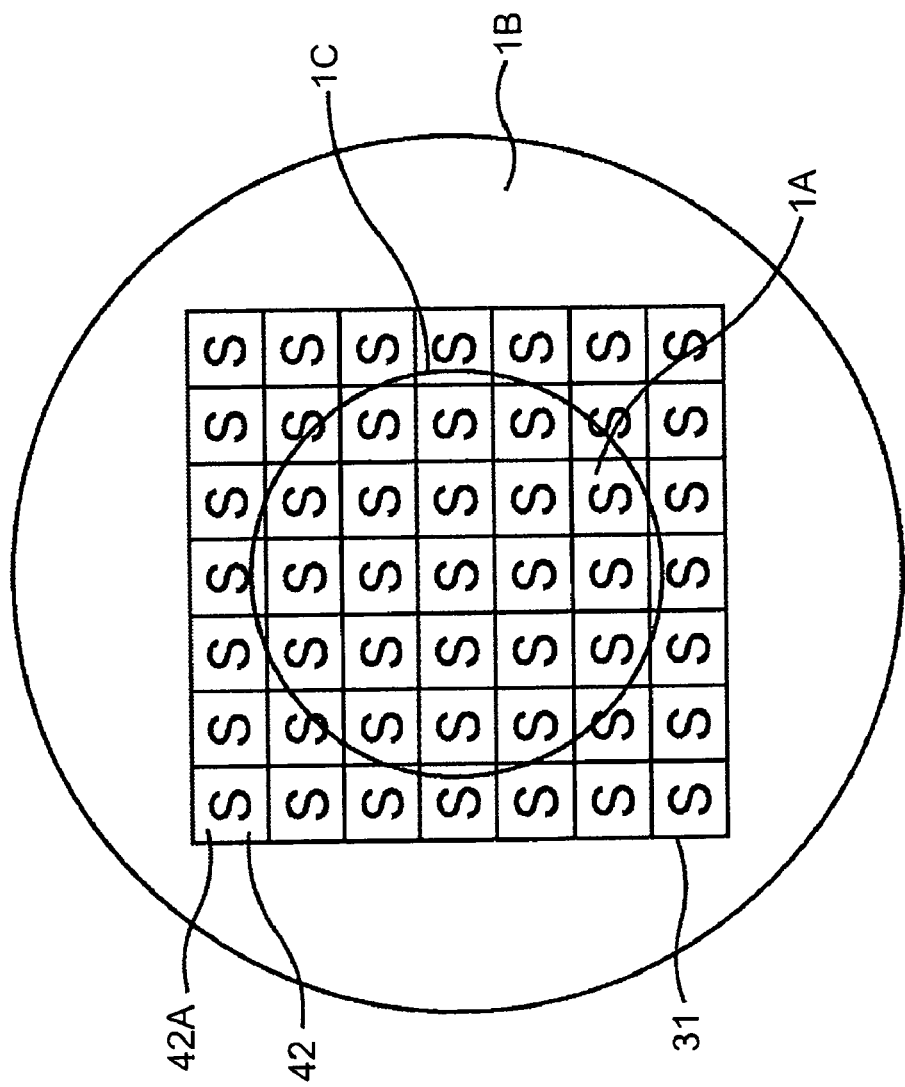
FIG. 4 is a plan view of the arrangement of display elements.
Figure 5:
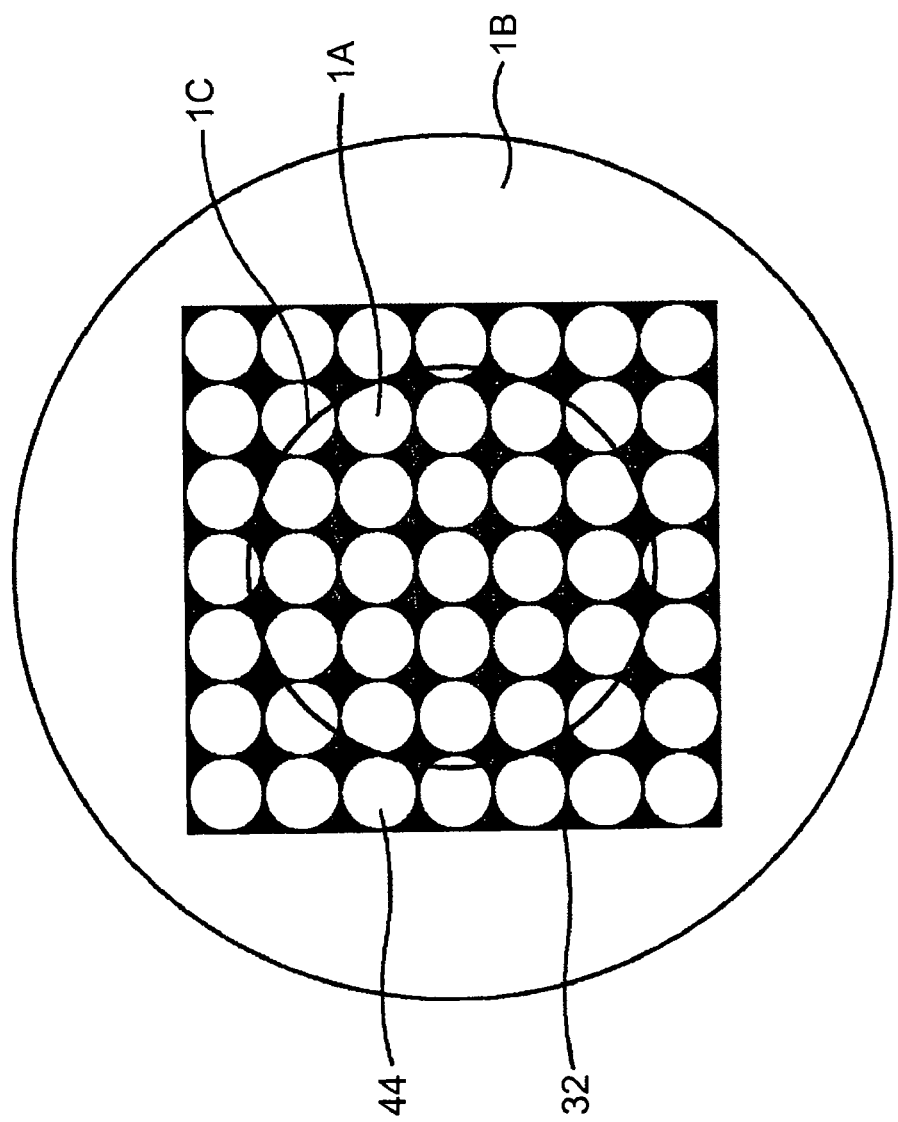
FIG. 5 is a plan view of the structure of a lens array unit.

Referring to FIG. 2, a circle 1C segments the whole area of the image display apparatus 1 into an inner area 1A and an outer area 1B as viewed from the front of an eyeball. The diameter D2 of the circle 1C is substantially equal to or larger than the maximum diameter D1 of the inner rim 13A of the iris 13 of the human eye 11. As shown in FIGS. 3 to 5, the display unit 31 for displaying images and the lens array unit 32 for transmitting light rays from the display unit 31 to an eyeball 11A are arranged in at least the inner area 1A.

For example, as shown in FIGS. 3 and 4, the display unit 31 includes a plurality of display elements 42. In the following description, when it is unnecessary to discriminate between display elements 42-1, 42-2, 42-3, . . . , they will be simply referred to as display elements 42. The same applies to other components. Each display element 42 includes, e.g., a liquid crystal display, an organic electroluminescence (EL) display, or a field emission display (FED). Referring to FIG. 4, 7×7, i.e., 49 display elements 42 are arranged in a matrix on a curved surface, e.g., a substantially spherical surface 30 (refer to FIG. 3) fitted to the surface of a human eye (or an animal eye when the image display apparatus 1 is attached to an animal). The curved surface 30 may be a curved surface specific to each individual user or the average curved surface of the human eyeball.

Each display element 42 has a display area 42A and is designed so as to independently display an image. In other words, each display element 42 includes a plurality of pixels so as to display an image that can be independently recognized by a human being. FIG. 4 shows a state where the respective display elements 42 display images each representing a letter "S".

The display unit 31 is integrated with the lens array unit 32 such that the units are parallel to each other. The lens array unit 32 includes a plurality of lenses 44 as shown in FIG. 5. The lenses 44 (see FIG. 5) are arranged so as to correspond to the display elements 42 (see FIG. 4) of the display unit 31, respectively. Referring to FIG. 5, therefore, 7×7, i.e., 49 lenses 44 are arranged so as to correspond to the respective display elements 42 in FIG. 4. FIG. 3 more specifically shows a state where lenses 44-1 to 44-3 are arranged so as to correspond to display elements 42-1 to 42-3, respectively. In other words, the lenses 44 are arranged in a matrix on the curved surface 30.

Referring to FIGS. 4 and 5, the display areas 42A and the lenses 44 are arranged in the whole of the area 1A within the circle 1C. Since the diameter D2 of the circle 1C is equal to or larger than the maximum diameter D1 of the inner rim 13A of the iris 13, i.e., the maximum diameter of the pupil 12, the display areas 42A exist so as to cover the entire pupil 12 irrespective of the size of the diameter D1 of the inner circle 13A of the iris 13. Consequently, light rays of images in the more display areas 42A reliably form images at points 14-1 to 14-3 on the retina 15 of the eyeball 11A. In the present embodiment, the diameter D2 of the circle 1C is smaller than the diameter D3 of the outer rim 13B of the iris 13. The diameter D2 may be larger than the diameter D3.

The display elements 42 and the lenses 44 are densely arranged with such a pitch that a user can recognize the formed images as one combined image (i.e., the combined image is not partly missing).

Again referring to FIG. 3 schematically showing the sectional view of the display unit 31 and the lens array unit 32, a lubricating member 41, made of transparent plastic, is formed on the display elements 42-1 to 42-3 such that the lubricating member 41 and the lenses 44-1 to 44-3 are on opposite sides of the display unit 31. Accordingly, when the user wears the image display apparatus 1 on their eye, the user's eyelids are smoothly movable. In addition, when displaying no images, the display unit 31 transmits external light rays. Accordingly, the user can view external objects. A protecting film 43, made of transparent plastic, is formed under the display elements 42-1 to 42-3 such that the protecting film 43 is in contact with the lenses 44-1 to 44-3. Thus, damage to the display elements 42-1 to 42-3 caused by contact with the lenses 44-1 to 44-3 can be prevented.

The lenses 44-1 to 44-3 are in tight contact with each other. A protecting member 33, made of transparent plastic, is formed under the lenses 44 so that the protecting member 33 is come into contact with the eyeball 11A (the pupil 12). Accordingly, when the user places the image display apparatus 1 on their eye 11, damage to the eyeball 11A can be prevented. When a distance from the lubricating member 41 to the protecting member 33, i.e., the thickness T of the image display apparatus 1 is thick, the user feels discomfort in their eye upon wearing the apparatus 1. Preferably, the thickness T is approximately 0.2 mm or less.

The lubricating member 41, the protecting film 43, and the protecting member 33 may be formed as a plurality of layers having the same or different properties.

It is assumed that the diameter of each lens is approximately 0.2 mm. In the case of displaying an XGA (extended Graphics Array) image, the pixel pitch of the display elements 42 is set to approximately 0.1 μm. In the case of displaying a VGA (Video Graphics Array) image, the pixel pitch is set to approximately 0.2 μm.

Figure 10:
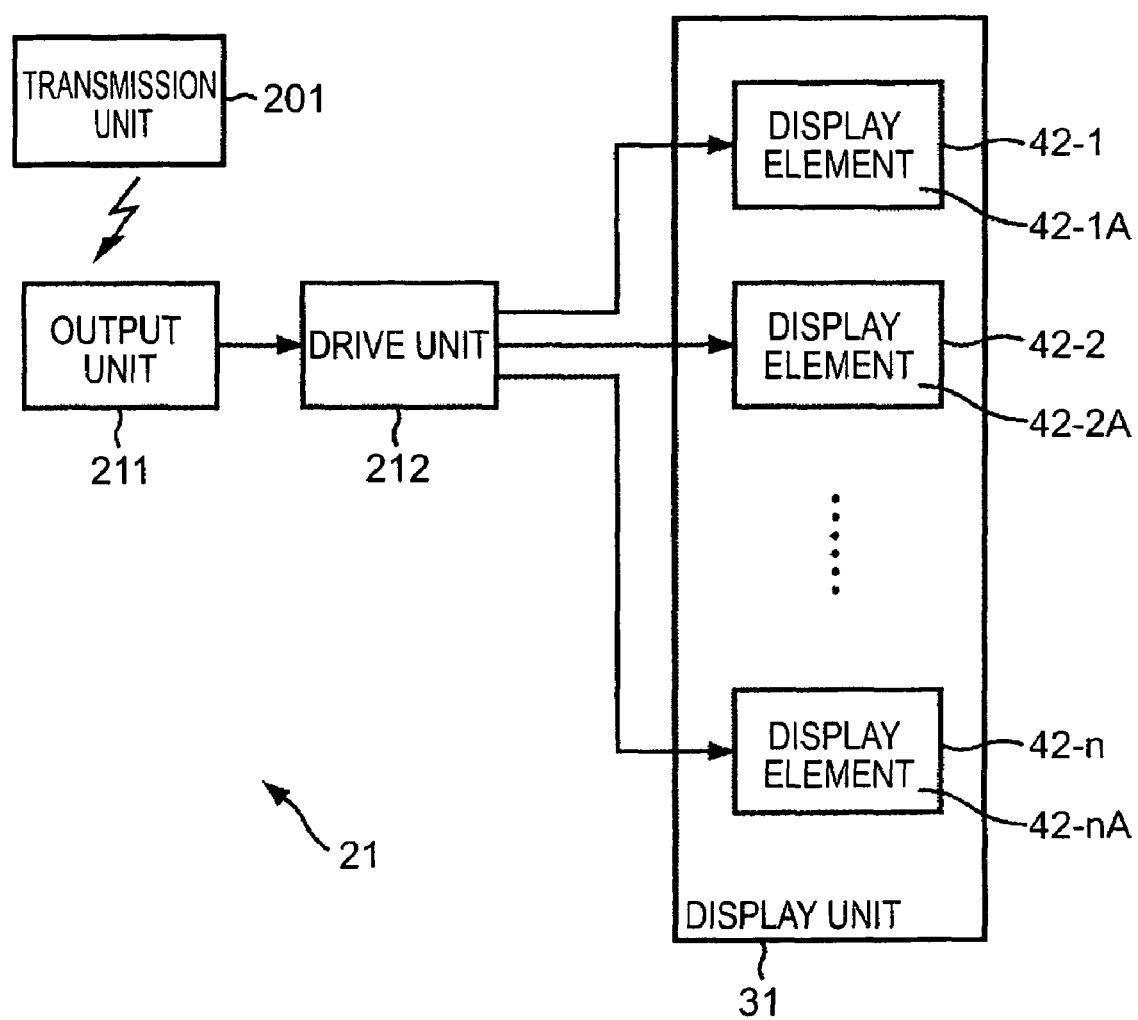
FIG. 10 is a block diagram showing the structure of a circuit unit according to the embodiment of the present invention.
Figure 12:
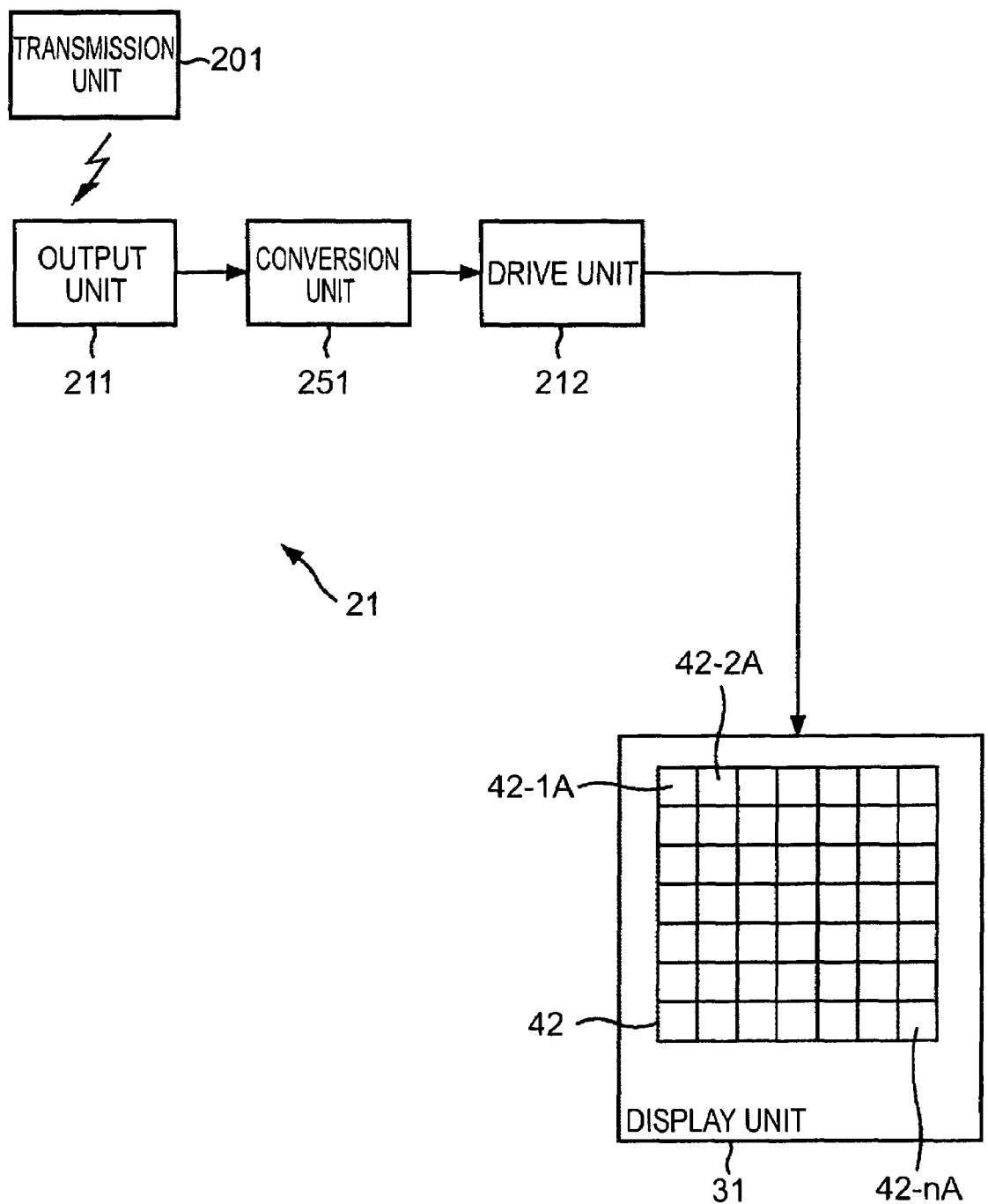
FIG. 12 is a block diagram showing the structure of a circuit unit according to a modification of the embodiment.

A circuit unit 21, which will be described below with reference to FIGS. 10 and 12, is arranged in the area 1B outside the circle 1C. According to the present embodiment, the circuit unit 21 includes an output unit 211 and a drive unit 212 (refer to FIG. 10). According to a modification of the present embodiment, a circuit unit 21 includes an output unit 211, a drive unit 212, and a conversion unit 251 (see FIG. 12). The circuit unit 21 supplies image signals to the display areas 42A. Therefore, the circuit unit 21 is disposed in the area 1B, serving as the outer region of the display unit 31, so as not to interfere with displaying of images in the display areas 42A.

In FIG. 3, it is assumed that the lenses (not shown) are arranged around the lens 44-1, i.e., on the left side of the lens 44-1 and on this and the other sides thereof in the direction perpendicular to the drawing sheet. Similarly, the lenses (not shown) are arranged on this and the other sides of the lens 44-2 in the direction perpendicular to the drawing sheet. In addition, the lenses (not show) are similarly arranged on the right side of the lens 44-3 and on this and the other sides thereof in the direction perpendicular to the drawing sheet. The display unit 31 is disposed such that the display surface is positioned in the vicinity of (i.e., closer to the lenses 44 than) focal points (focal length positions) at which initially collimated rays of light meet after passing through the respective lenses 44-1 to 44-3. In other words, the lens 44-1 transmits (collimates) image light rays incident from the display element 42-1 and releases the rays as substantially parallel rays. Similarly, image light rays emitted from the display elements 42-2 and 44-3 are released as substantially parallel rays from the lenses 44-2 and 44-3, respectively.

Figure 6:
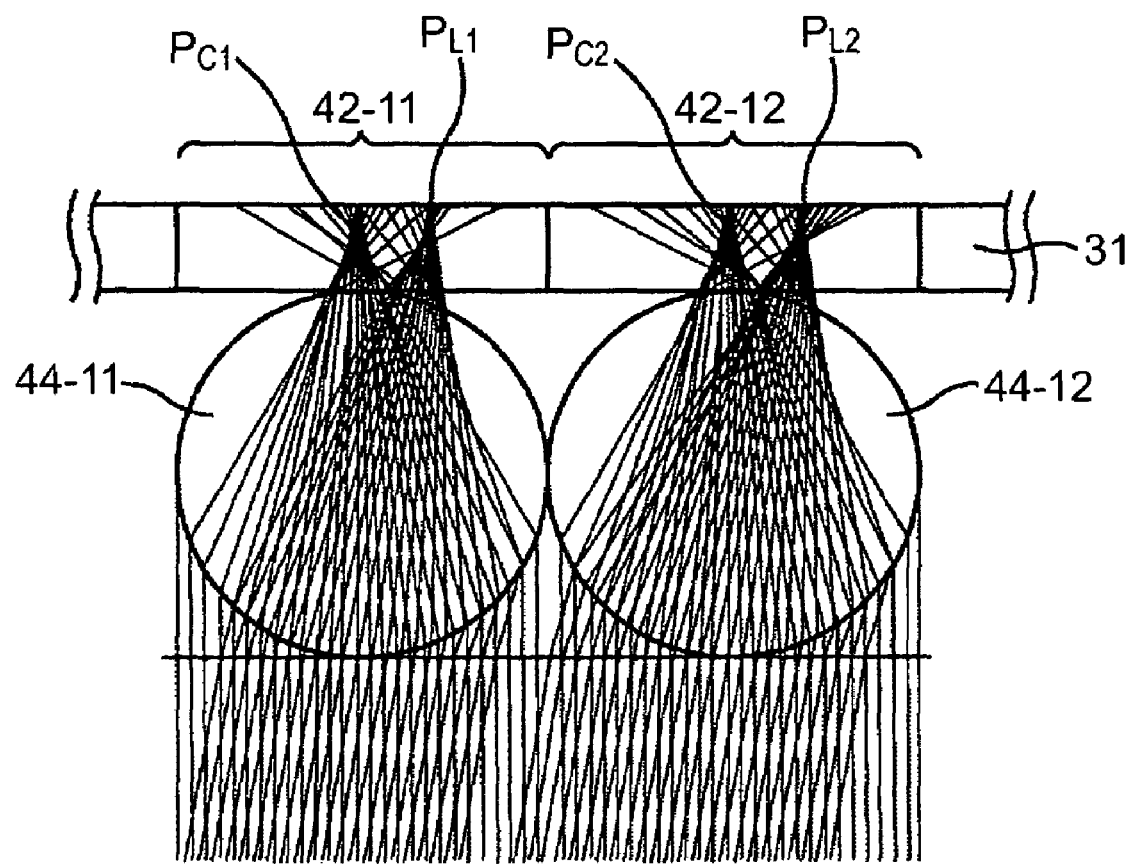
FIG. 6 is a sectional view of the relationship between the display elements and the lenses.

FIG. 6 shows the relationship between light rays emitted from the display elements 42 and the lenses 44. Light rays emitted from a point $P_{L1}$, slightly shifted to the right from substantially the center of a left display element 42-11, are substantially collimated by a lens 44-11 to form an image at, e.g., the point 14-3 (see FIG. 1) on the retina 15. Light rays emitted from a point $P_{C1}$ in substantially the center of the display element 42-11, i.e., on the left of the point $P_{L1}$ are substantially collimated by the lens 44-11 to form an image at the point 14-1 (see FIG. 1) on the retina 15.

Similarly, image light rays emitted from a point $P_{L2}$, which corresponds to the point $P_{L1}$ in the display element 42-11 and is slightly shifted to the right from substantially the center of a right display element 42-12, are substantially collimated by a lens 44-12 to form an image at the point 14-3 on the retina 15. Light rays emitted from a point $P_{C2}$, which corresponds to the point $P_{C1}$ in the display element 42-11 and is positioned on the left side of the point $P_{L2}$ (i.e., in substantially the center of the display element 42-11), are substantially collimated by the lens 44-12 to form an image at the point 14-1 on the retina 15.

The light rays emitted from the points $P_{L1}$ and $P_{L2}$, serving as pixels corresponding to each other, form the images at the same point on the retina 15. Similarly, the light rays emitted from the points $P_{C1}$ and $P_{C2}$, serving as pixels corresponding to each other, form the images at the same point on the retina 15.

Again referring to FIG. 3, light rays emitted from substantially the center pixel of each of the display elements 42-1 to 42-3 form an image at the point 14-1, light rays emitted from a left pixel of each of the display elements 42-1 to 42-3 form an image at the point 14-2, and light rays emitted from a right pixel of each of the display elements 42-1 to 42-3 form an image at the point 14-3.

Figure 7:
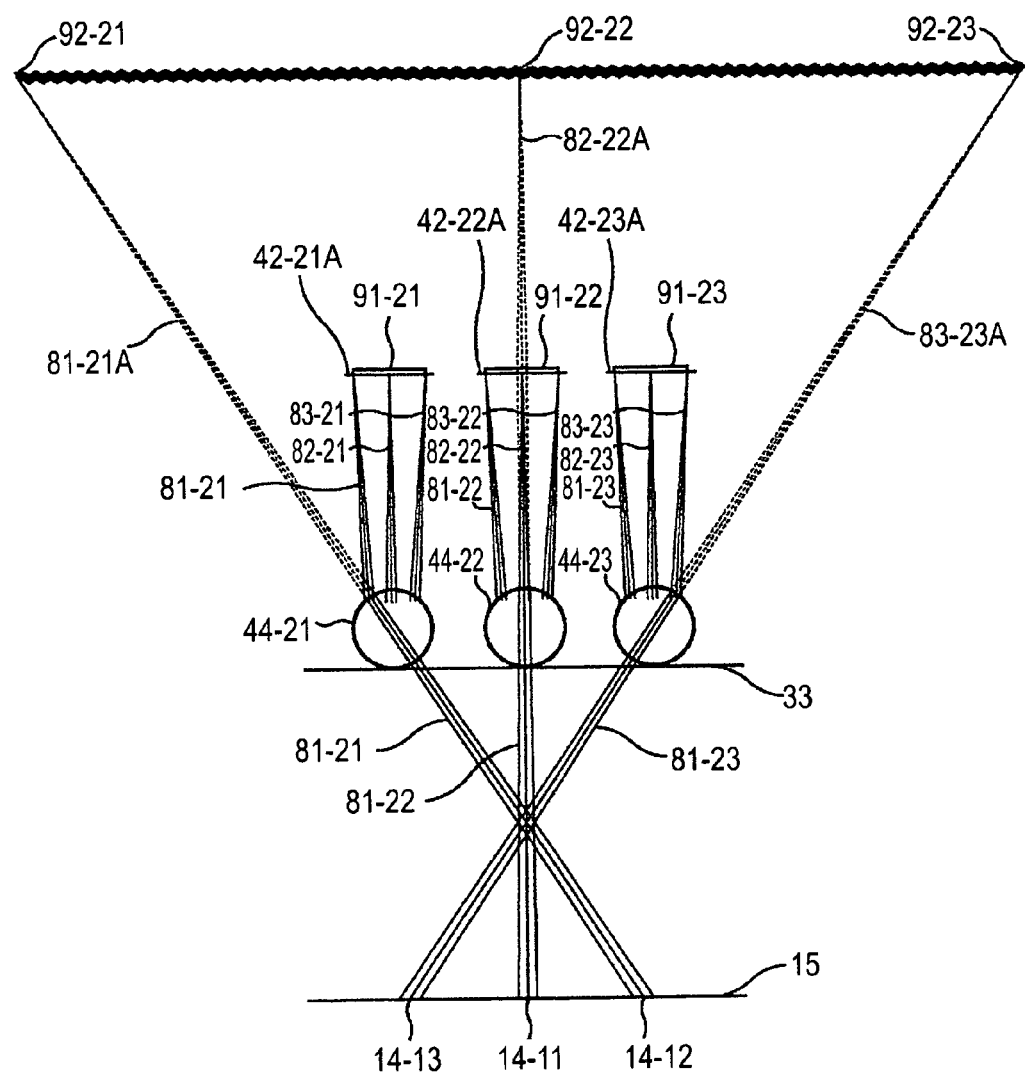
FIG. 7 is a diagram explaining a virtual-image optical system.

The above-described relationship will be explained in more detail with reference to FIG. 7. As shown in FIG. 7, it is assumed that a display area 42-21A is located on the leftmost, a display area 42-22A is located on the right of the display area 42-21A (i.e., in substantially the center), and a display area 42-23A is located on the right of the display area 42-22A. Real images 91-21, 91-22, and 91-23 are displayed in the display areas 42-21A, 42-22A, and 42-23A, respectively. There is no parallax between those real images 91-21 to 91-23. The real images 91-21 to 91-23 are substantially the same. Consequently, a two-dimensional image can be visualized. To visualize a stereoscopic image, images with parallax are used.

Figure 8:
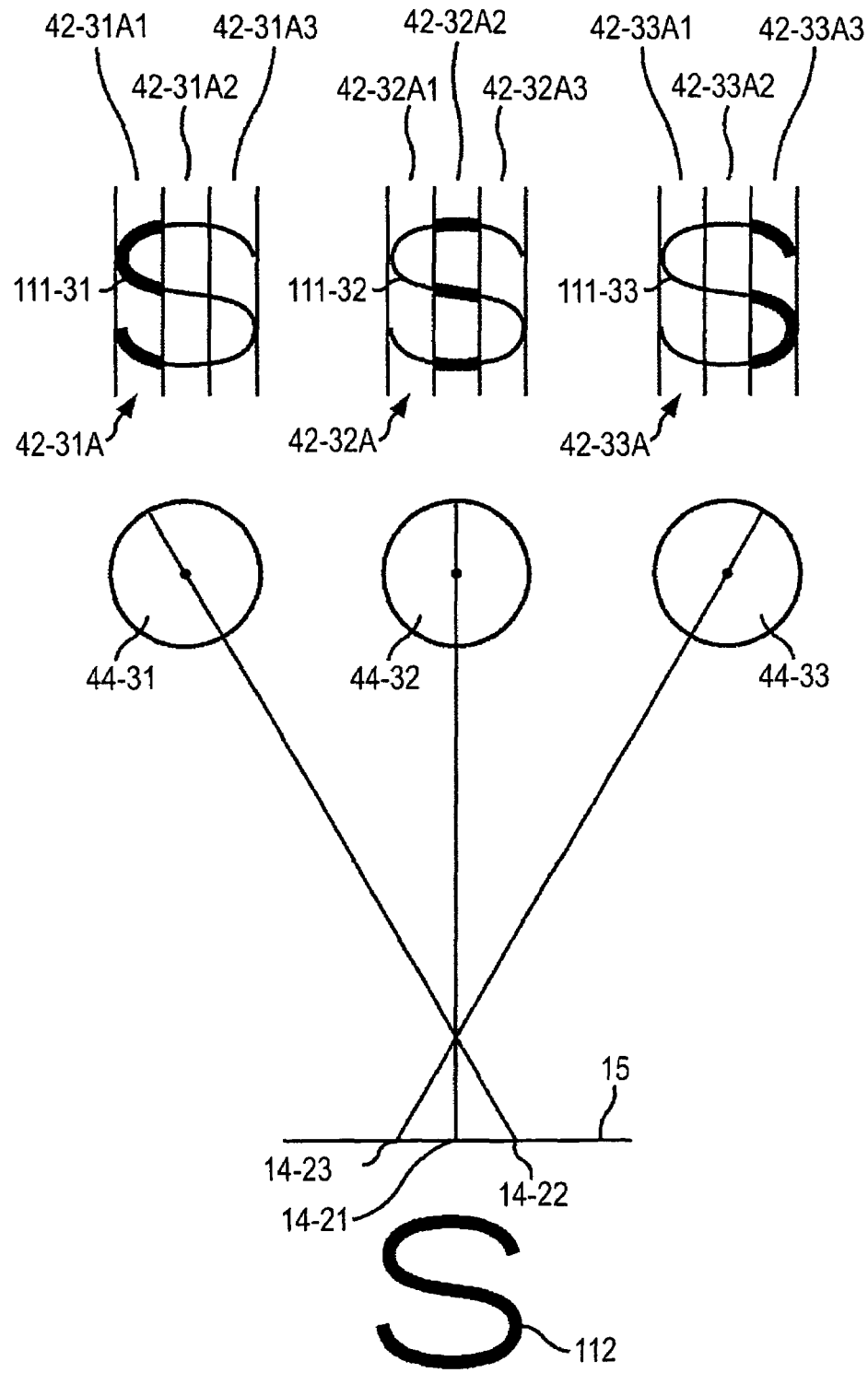
FIG. 8 is a diagram explaining the combination of images in the lateral direction.
Figure 9:
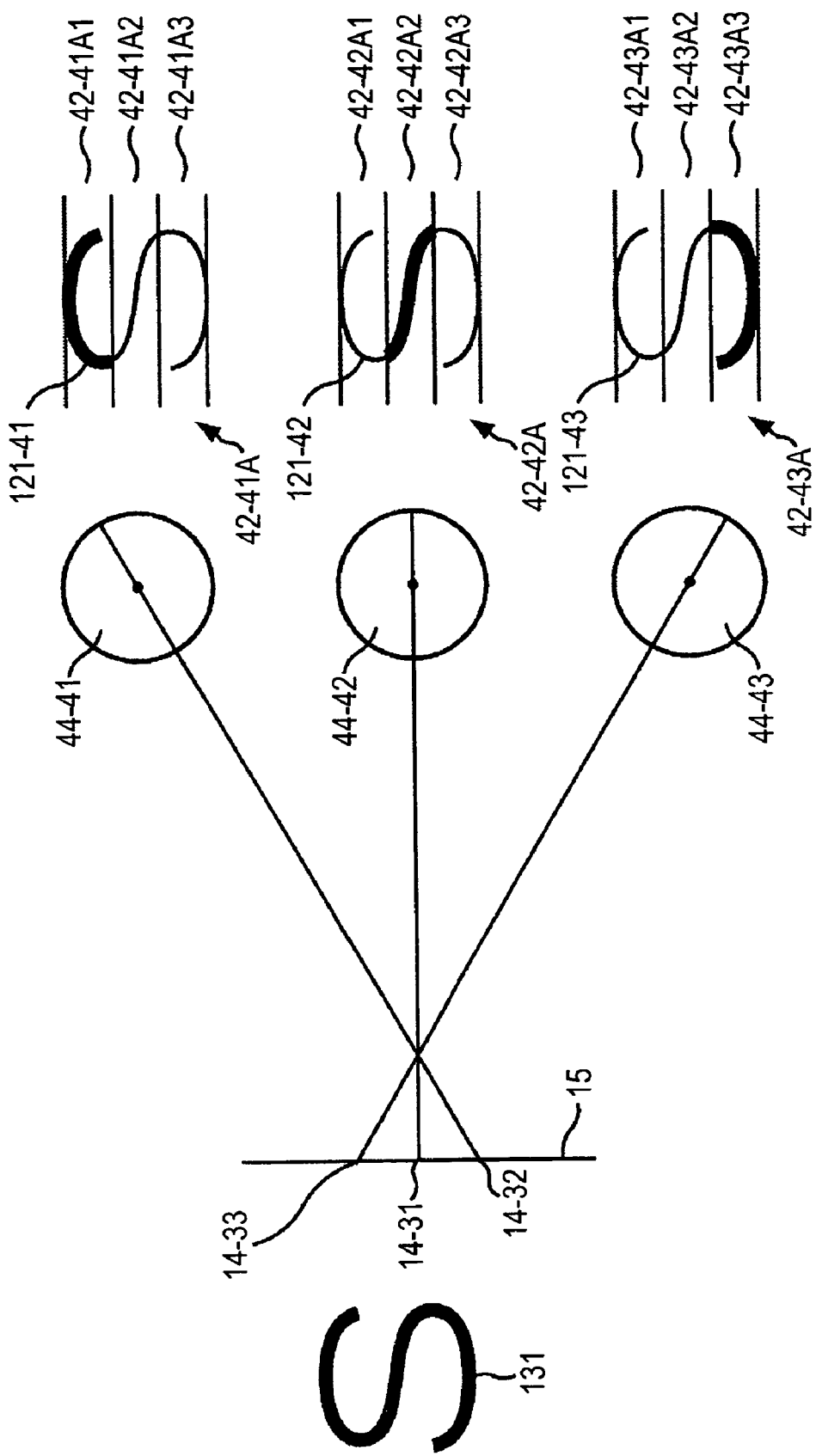
FIG. 9 is a diagram explaining the combination of images in the longitudinal direction.

In FIG. 7 and FIGS. 8 and 9, which will be described later, optical paths are actually refracted by the respective surfaces of the lenses. However, the refraction is not omitted in FIGS. 7 to 9.

As for the real image 91-21 in the display area 42-21A, light rays 81-21 emitted from a left pixel of the image 91-21 in FIG. 7 are substantially collimated by a lens 44-21 to form an image at a point 14-12 on the retina 15. However, as compared to the light rays 81-21, it is difficult for light rays 82-21 emitted from a middle pixel located at a distance from the left pixel corresponding to the light rays 81-21 to form an image in the visual field on the retina 15 through the lens 44-21. In addition, as compared to the light rays 82-21, it is more difficult for light rays 83-21 emitted from a right pixel located at a further distance from the left pixel corresponding to the light rays 82-21 to form an image in the visual field on the retina 15 through the lens 44-21. In other words, as for the real image 91-21, the light rays emitted from the left pixel dominantly form the image at the point 14-12 in the visual field on the retina 15.

As for the real image 91-22 in the middle display area 42-22A, as compared to light rays 81-22 emitted from the leftmost pixel and light rays 83-22 emitted from the rightmost pixel, light rays 82-22 emitted from the middle pixel dominantly form an image at a point 14-11 in the visual field on the retina 15.

On the other hand, as for the real image 91-23 in the right display area 42-23A, light rays 83-23 emitted from the rightmost pixel serve as dominant light rays that are emitted from the display area 42-23A and are substantially collimated through a lens 44-23 to form an image at a point 14-13 in the visual field on the retina 15. Light rays 82-23 emitted from a middle pixel located at a distance from the rightmost pixel are secondarily dominant. It is the most difficult for light rays 81-23 emitted from the leftmost pixel in the display area 42-23A to form an image at the point 14-13 in the visual field on the retina 15.

As described above, the dominant component of light rays emitted from the pixels corresponding to the real image 91-21 displayed in the display area 42-21A is the light rays emitted from the left pixel. Similarly, the dominant component of light rays emitted from the pixels corresponding to the real image 91-22 displayed in the middle display area 42-22A is the light rays emitted from the middle pixel and the dominant component of light rays emitted from the pixels corresponding to the real image 91-23 displayed in the right display area 42-23A is the light rays emitted from the right pixel. The above-described dominant light rays form images at the points 14-12, 14-11, and 14-13 in the visual field on the retina 15, respectively.

The image at the point 14-12 is recognized as a virtual image 92-21 formed by light rays 81-21A which are virtually obtained by tracing the light rays 81-21 from the lens 44-21 in the reverse direction. The image at the point 14-11 is recognized as a virtual image 92-22 formed by light rays 82-22A which are virtually obtained by tracing the light rays 82-22 from a lens 44-22 in the reverse direction. The image at the point 14-13 is recognized as a virtual image 92-23 formed by light rays 83-23A which are virtually obtained by tracing the light rays 83-23 from the lens 44-23 in the reverse direction. Actually, the same phenomenon occurs every pixel. Therefore, the user visually recognizes a plurality of real images, including the real images 91-21 to 91-23, displayed in the respective display areas 42A as one combined virtual image. In other words, on the basis of the principle of a ray-regenerating method, a virtual-image optical system is designed so that light rays emitted from the display unit 31 form images on the retina 15. Thus, an ultra thin image display apparatus can be realized.

FIG. 8 schematically shows the above-described image combination. In other words, as shown in FIG. 8, it is assumed that the same images 111-31 to 111-33 (each representing a letter "S") are displayed in display areas 42-31A to 42-33A, respectively. Light rays, including an image segment (left segment of the letter "S") in a left portion 42-31A1 as a major component, are substantially collimated by a lens 44-31 to form an image at a point 14-22 in the visual field on the retina 15. On the other hand, light rays, corresponding to image segments (middle and right image segments of the letter "S") in middle and right portions 42-31A2 and 42-31A3 of the display area 42-31A, do not form an image in the visual field on the retina 15 through the lens 44-31. Alternatively, if the light rays form an image, the energy of the light rays is small.

As for light rays corresponding to pixels in the middle display area 42-32A in FIG. 8, the energy of light rays that form an image at a point 14-21 in the visual field on the retina 15 through a lens 44-32 includes light rays, corresponding to image segments (left and right segments of the letter "S") in left and right portions 42-32A1 and 42-32A3, as minor components and those corresponding to an image segment (middle segment of the letter "S") in a middle portion 42-32A2 as a major component.

As for light rays corresponding to pixels in the right display area 42-33A in FIG. 8, the energy of light rays that form an image at a point 14-23 in the visual field on the retina 15 through a lens 44-33 includes light rays, corresponding to an image segment (right segment of the letter "S") in a right portion 42-33A3, as a dominant (major) component and light rays, corresponding to image segments (middle and left segments of the letter "S") in middle and left portions 42-33A2 and 42-33A1, as minor components.

As described above, in the eye 11, the same images 111-31 to 111-33 displayed in the display areas 42-31A to 42-33A are combined into one image 112 which is visually recognized by the user. In other words, a virtual image having the left segment of the image 111-31 (letter "S") as a major component, a virtual image having the meddle segment of the image 111-32 (letter "S") as a major component, and a virtual image having the right segment of the image 111-33 (letter "S") as a major component are combined into the image (letter "S") 112.

The above-described image combination is performed not only in the lateral direction but also in the longitudinal direction. The image combination in the longitudinal direction will now be described with reference to FIG. 9.

It is assumed that display areas 42-41A, 42-42A, and 42-43A are arranged in the upper, middle, and lower portions in FIG. 9. Lenses 44-41 to 44-43 are arranged so as to correspond to the display areas 42-41A to 42-43A, respectively.

Regarding an image (letter "S") 121-41 displayed in the display area 42-41A, most of light rays, corresponding to an image segment (upper segment of the letter "S") in an upper portion 42-41A1, form an image at a point 14-32 in the visual field on the retina 15 through the lens 44-41. On the other hand, light rays, corresponding to image segments (middle and lower segments of the letter "S") in middle and lower portions 42-41A2 and 42-41A3, hardly form an image at the point 14-32 in the visual field on the retina 15 or do not form an image.

Similarly, regarding an image (letter "S") 121-42 displayed in the middle display area 42-42A, most of light rays, corresponding to an image segment (middle segment of the letter "S") in a middle portion 42-42A2, form an image at a point 14-31 in the visual field on the retina 15 through the lens 44-42. On the other hand, light rays, corresponding to image segments (upper and lower segments of the letter "S") in upper and lower portions 42-42A1 and 42-42A3, hardly form an image at the point 14-31 or do not form an image.

Regarding an image (letter "S") 121-43 displayed in the lower display area 42-43A, most of light rays, corresponding to an image segment (lower segment of the letter "S") in a lower portion 42-43A3, form an image at a point 14-33 in the visual field on the retina 15 through the lens 44-43. On the other hand, light rays, corresponding to image segments (middle and upper segments of the letter "S") in middle and upper portions 42-43A2 and 42-43A1, hardly form an image at the point 14-33 or do not form an image.

As described above, in the user's eye 11, light rays having the different major components corresponding to different segments (i.e., the upper, middle, and lower segments of the letter "S") of the substantially same images (letters "S") are combined and the resultant image is recognized as one virtual image 131 (letter "S"). Even when a predetermined pixel is defective in one display element 42 and the defective pixel cannot function, therefore, the corresponding pixels of the other display elements 42, located in the vicinity of the display element 42 having the defective pixel, display so as to cover the defect. Advantageously, the appearance of a pixel defect can be minimized.

FIG. 10 shows an example of the structure of a circuit unit for supplying image signals to the display unit 31. According to the present embodiment, the circuit unit 21 includes the output unit 211 and the drive unit 212. The output unit 211 has therein an antenna and a tuner. The output unit 211 receives image signals transmitted by radio or through the user's body from a transmission unit 201. The transmission unit 201 is disposed in a space designated for the use of the image display apparatus 1. The output unit 211 demodulates the received signals and outputs the resultant signals to the drive unit 212. The drive unit 212 outputs the image signals supplied from the output unit 211 to display elements 42-1 to 42-$n$ constituting the display unit 31. The display elements 42-1 to 42-$n$ have display areas 42-1A to 42-$n$A, respectively. In the present embodiment, the drive unit 212 supplies the same image signals to the display elements 42-1 to 42-$n$. Therefore, the display areas 42-1A to 42-$n$A display the same images.

Figure 11:
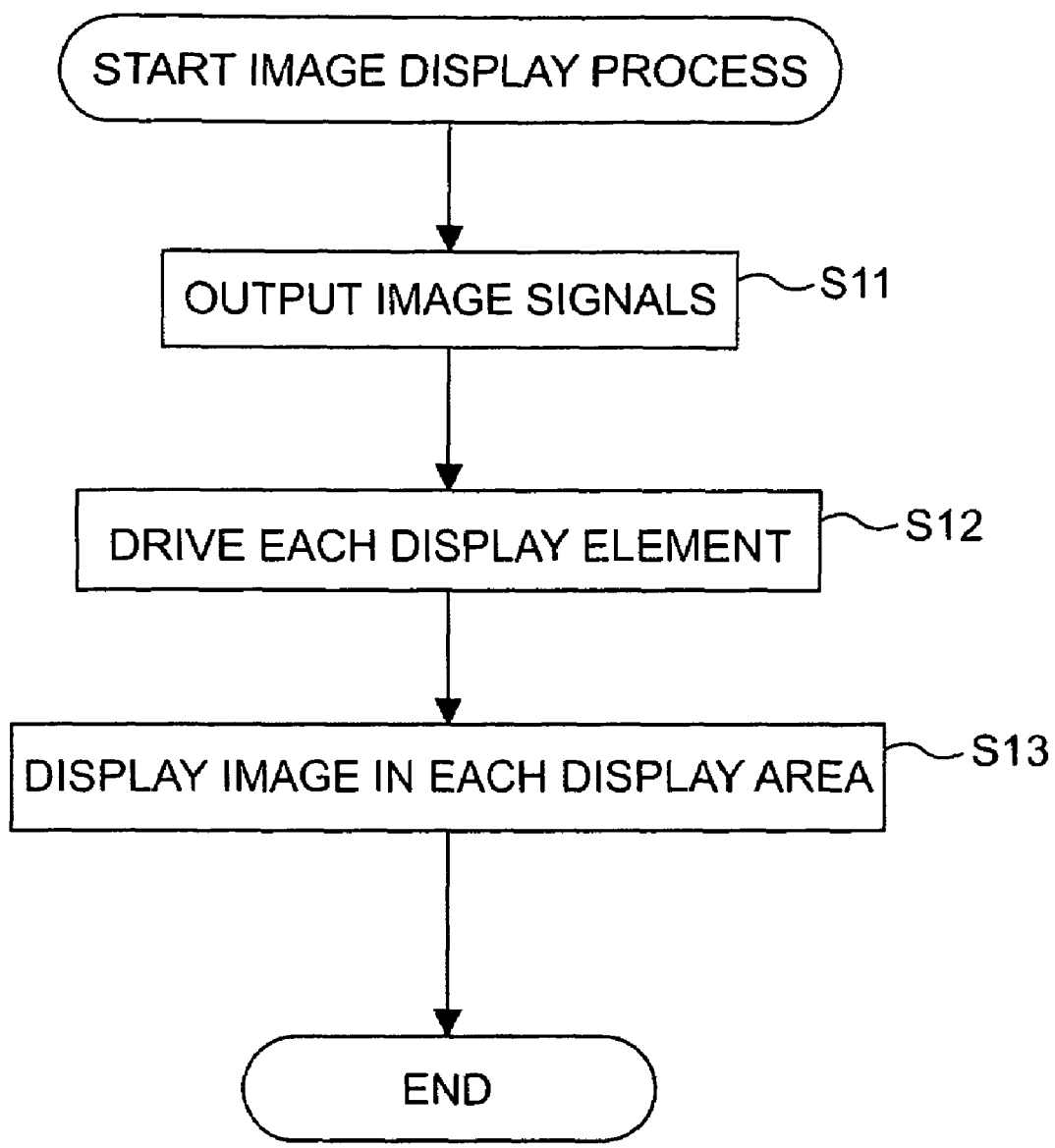
FIG. 11 is a flowchart of an image display process according to the embodiment.

An image display process according to the present embodiment will now be described with reference to a flowchart of FIG. 11.

In step S11, the output unit 211 receives image signals transmitted by radio or through the user's body from the transmission unit 201, modulates the signals, and outputs the resultant image signals. In step S12, the drive unit 212 drives each display element. Specifically, the drive unit 212 supplies the image signals from the output unit 211 to the display elements 42-1 to 42-$n$. In step S13, the display unit 31 displays images. In other words, the display elements 42-1 to 42-$n$ display the images in the display areas 42-1A to 42-$n$A, respectively, on the basis of the image signals supplied from the drive unit 212.

Light rays having different major components corresponding to different segments of the same images displayed by the display elements 42-1 to 42-$n$ form images on the retina 15 of the user's eye 11 through the respective lenses 44 (i.e., n lenses corresponding to the respective display elements 42-1 to 42-$n$) of the lens array unit 32. The user recognizes the formed images as one image (virtual image).

In the above description, the number of display elements 42 is set to n. One display element 42 may be used and the display area thereof may be divided into segments. FIG. 12 shows a modification of the present embodiment. As shown in FIG. 12, one display element 42 includes n display areas 42-1A to 42-$n$A. In this case, the display areas 42-1A to 42-$n$A display the same images. In the case of FIG. 12, therefore, the conversion unit 251 is arranged between the output unit 211 and the drive unit 212. The conversion unit 251 converts image signals, supplied from the output unit 211, for displaying one image in one screen into image signals for displaying n images in one screen.

The other structure is the same as that in FIG. 10.

Figure 13:
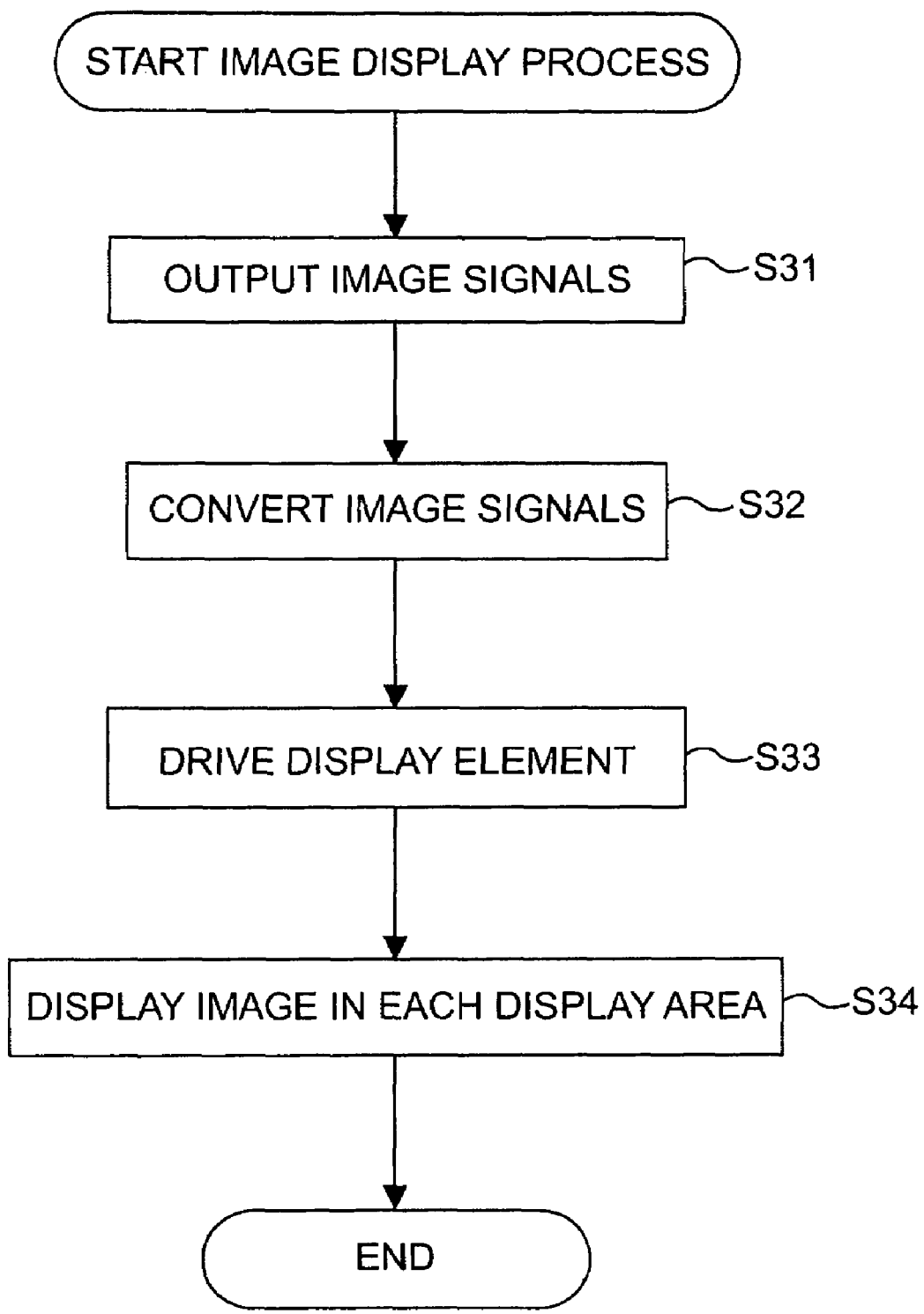
FIG. 13 is a flowchart of an image display process according to the modification.

An image display process according to the modification in FIG. 12 will now be described with reference to a flowchart of FIG. 13.

In step S31, the output unit 211 receives image signals transmitted by radio or through the user's body from the transmission unit 201, demodulates the signals, and outputs the resultant image signals. In step S32, the conversion unit 251 converts the image signals. In other words, the conversion unit 251 converts the image signals for one screen supplied from the output unit 211 into image signals so that n same images are displayed in one screen. For instance, image signals for displaying one image representing a letter "S" in one screen are converted into image signals for displaying 7×7 images each representing the letter "S" in one screen as shown in FIG. 4. In step S33, the drive unit 212 drives the display element. In other words, the drive unit 212 drives the display element 42 of the display unit 31 on the basis of the image signals supplied from the conversion unit 251. In step S34, the display unit 31 displays images. In other words, the n display areas 42-1A to 42-nA, constituting the display element 42, display the images each representing the letter "S", respectively. This display state is substantially the same as that shown in FIG. 4, where the letters "S" are displayed in the display elements 42, respectively.

In the user's eye 11, therefore, one image (virtual image) representing the letter "S" is displayed by combination in the same way as the structure of FIG. 10.

The transmission unit 201 may transmit image signals that have been converted. In this case, the conversion unit 251 may be omitted. The structure of the circuit unit 21 is the same as that shown in FIG. 10.

Figure 14:
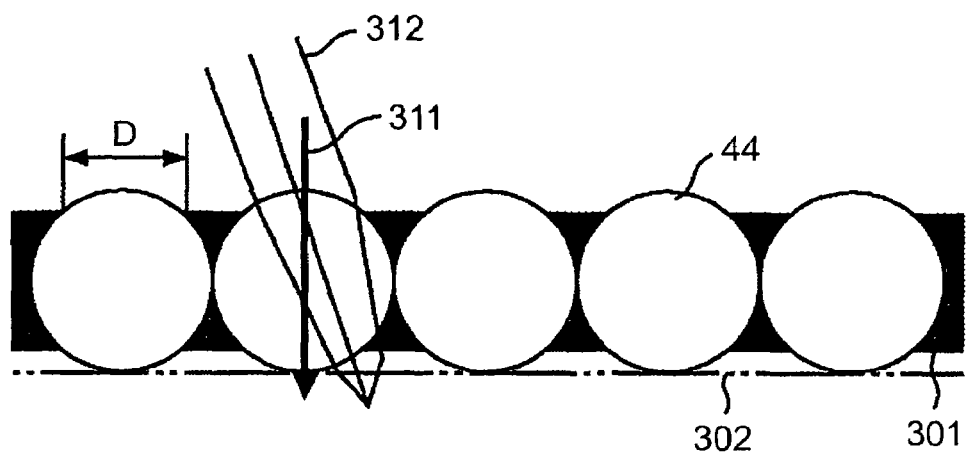
FIG. 14 is a sectional view of the connection of lenses.
Figure 15:
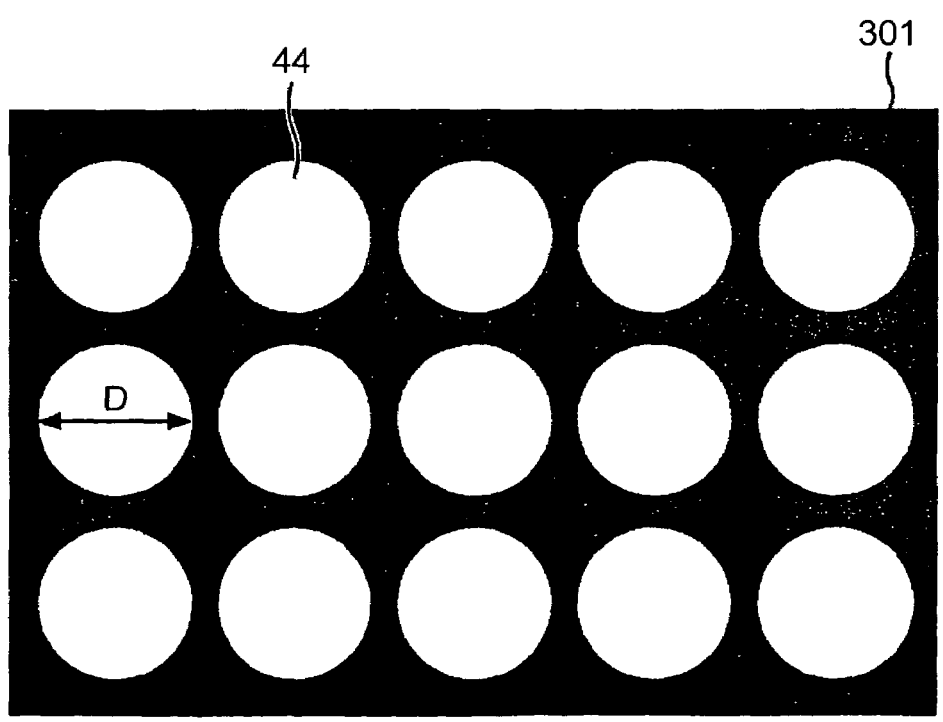
FIG. 15 is a plan view of the connection of the lenses.

FIGS. 14 and 15 show the detailed structure of the lens array unit 32. Referring to FIGS. 14 and 15, the lenses 44 are arranged in tight contact with each other on a curved surface 302 and are connected by a connecting member 301. The curved surface 302 corresponds to part of the surface (curved surface) of the eyeball of a human, to which the image display apparatus 1 is attached, in the same case as the curved surface 30 of FIG. 3. In the present embodiment, the thickness of the connecting member 301 is smaller than the diameter of the lens 44.

In this case, black paint may be mixed into a plastic material constituting the connecting member 301, alternatively, the upper and lower surfaces of the connecting member 301 may be colored with black paint so that the connecting member 301 does not transmit light. Thus, the effective diameter D of each lens 44 can be smaller than the pitch of the lenses 44. Consequently, as shown in FIG. 14, external light rays 312 can be prevented from passing through the lens 44, the light rays 312 having a predetermined angle or more with an arrow 311 along the direction toward the corresponding display element 42, i.e., perpendicular to the curved surface 302. Advantageously, the leakage of image light rays from adjacent display elements 42 can be prevented, the leakage causing interference.

In order to permit the user wearing the image display apparatus 1 to view external objects such that the brightness of the external objects is higher than that viewed through the connecting member 301 made of a light-shielding material while the display unit 31 is not displaying images, the connecting member 301 may be formed using a transparent material.

Figure 16:
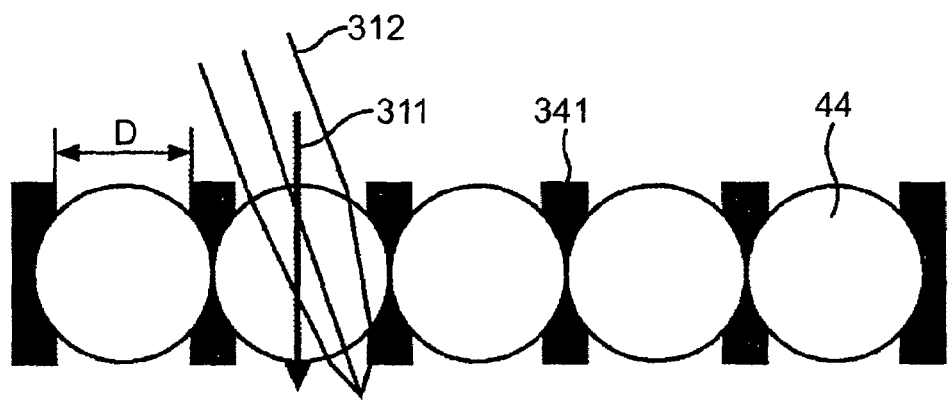
FIG. 16 is a sectional view of another connection of the lenses.

FIG. 16 shows an example of the structure of a connecting member according to a modification. According to this modification, a connecting member 341 is formed in such a manner that the thickness of the member 341 is substantially the same as the diameter of each lens 44 so as to surround each lens 44 like walls. When the connecting member 341 is made of a light-shielding material, the interference of light rays leaked from adjacent display elements 42 can be prevented in a manner similar to the case of FIG. 14. The connecting member 341 can permit only light rays 312 having a predetermined angle or less with an arrow 311 to pass through the lens 44 and block light rays having an angle larger than the predetermined angle with the arrow 311. In this case, the connecting member 341 may be formed using a transparent material so that the user can view external objects with higher brightness.

Figure 17:
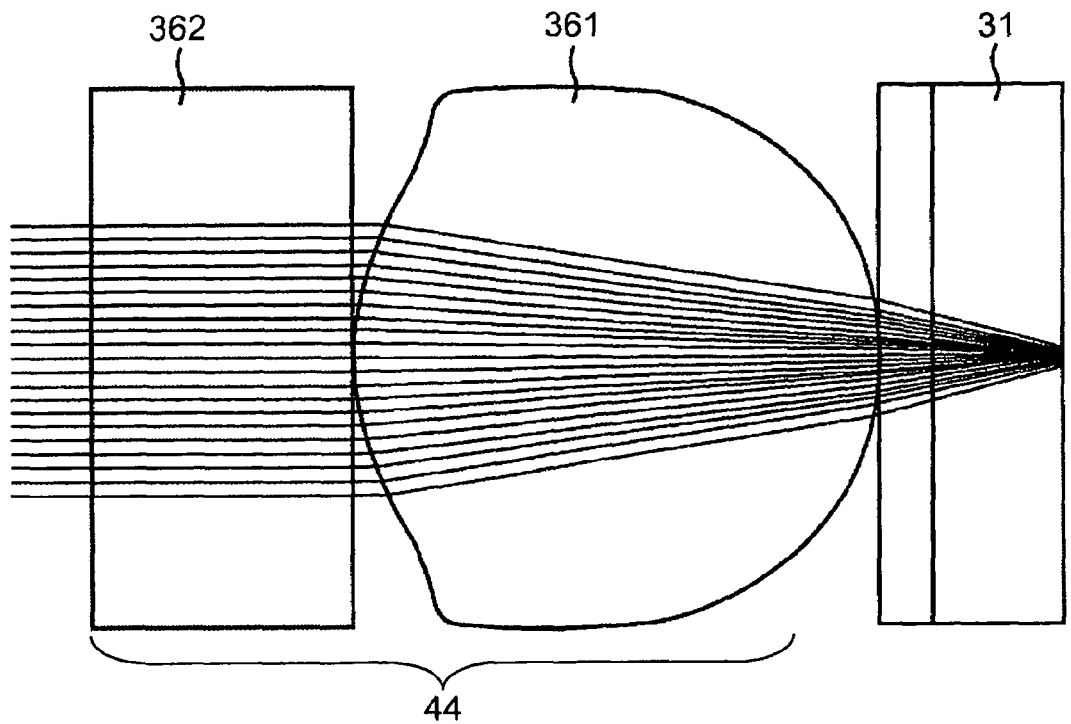
FIG. 17 is a sectional view of the structure of a lens according to a modification of the present embodiment.

In the above description, each lens 44 includes one spherical lens. FIG. 17 shows a modification of the lens 44. Referring to FIG. 17, a protecting layer 362 may be arranged on the rear of a lens 361 so that light rays emitted from the display unit 31 are substantially collimated. As for the shape of the lens 361, a predetermined portion about its optical axis on each of the opposite end surfaces (i.e., end surfaces of the lens 361 in the lateral direction in FIG. 17) are shaped into a substantially spherical form. Part between the opposite end surfaces is shaped into a substantially cylindrical form.

Figure 18:
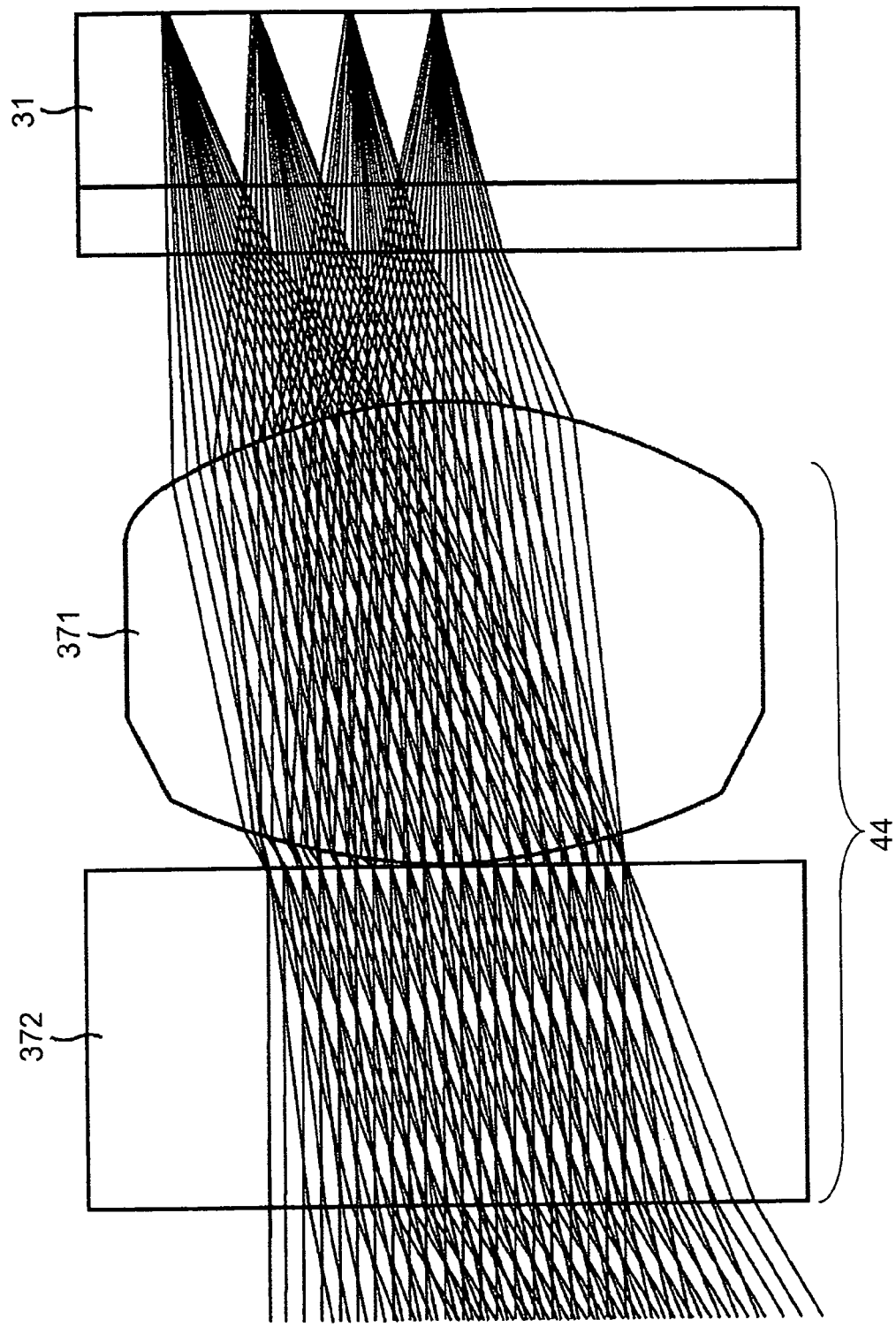
FIG. 18 is a sectional view of the structure of a lens according to another modification.

FIG. 18 shows another modification of the lens 44. In this modification, a protecting layer 372 is disposed on the rear of a lens 371. Each of opposite end surfaces of the lens 371 serves as part of a sphere. As viewed as a whole, the lens 371 is shaped into a convex lens.

Shaping each lens as shown in FIG. 17 or 18 can correct the aberration of the periphery of the lens.

The distance between each lens and the corresponding display area 42A in the display unit 31 may be adjusted to a predetermined value. The adjustment will now be described with reference to FIGS. 19 to 21. In each of FIGS. 19 to 21, a protecting layer 382 is disposed on the rear of a spherical lens 381.

Figure 19:
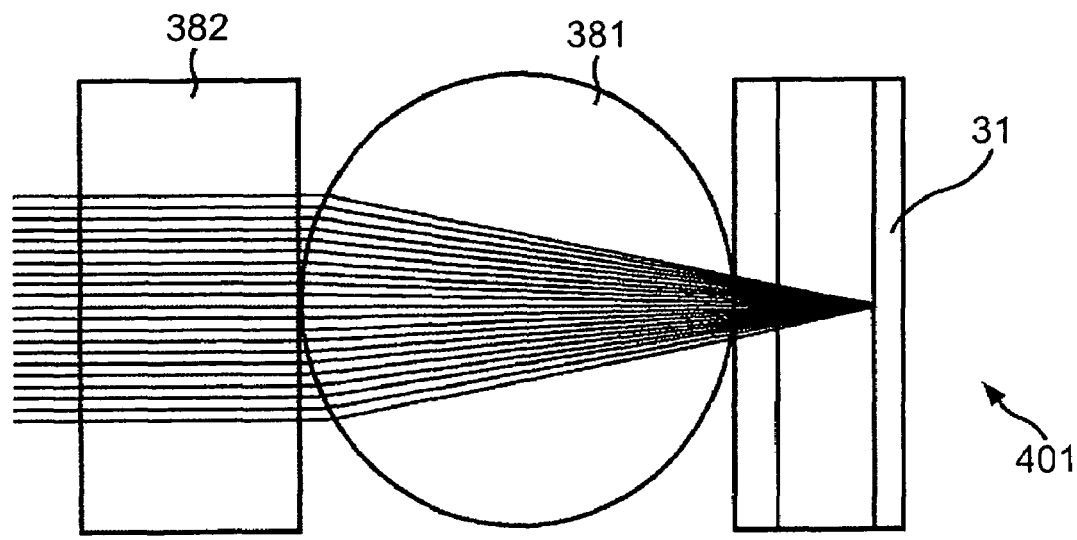
FIG. 19 is a sectional view of the structure of an image display apparatus according to another modification, the distance between each lens and the display surface of a display unit in the image display apparatus being adjusted.

FIG. 19 shows the structure of an image display apparatus 401 according to a modification of the present embodiment. In the image display apparatus 401, the distance between the display surface of a display unit 31 and a lens 381 is adjusted so that light rays emitted from the display unit 31 are released as parallel rays from the lens 381. The display surface (the corresponding display area 42A) of the display unit 31 is positioned at the focal point of the lens 381. Therefore, the lens 381 releases light rays of an image displayed in the display unit 31 as parallel rays.

Figure 20:
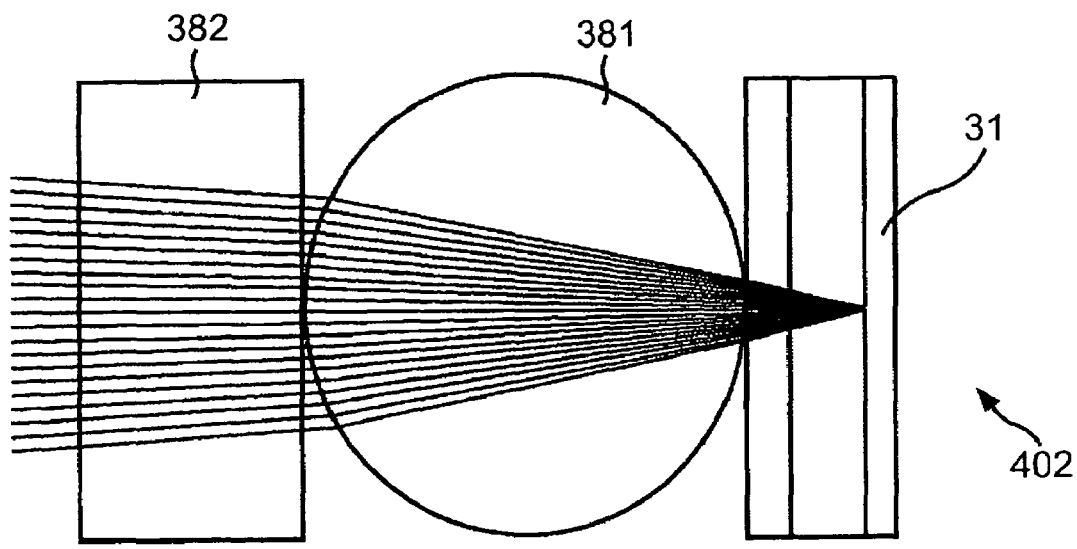
FIG. 20 is a sectional view of the structure of an image display apparatus according to another modification, the distance between each lens and the display surface of a display unit in the image display apparatus being adjusted.
Figure 21:
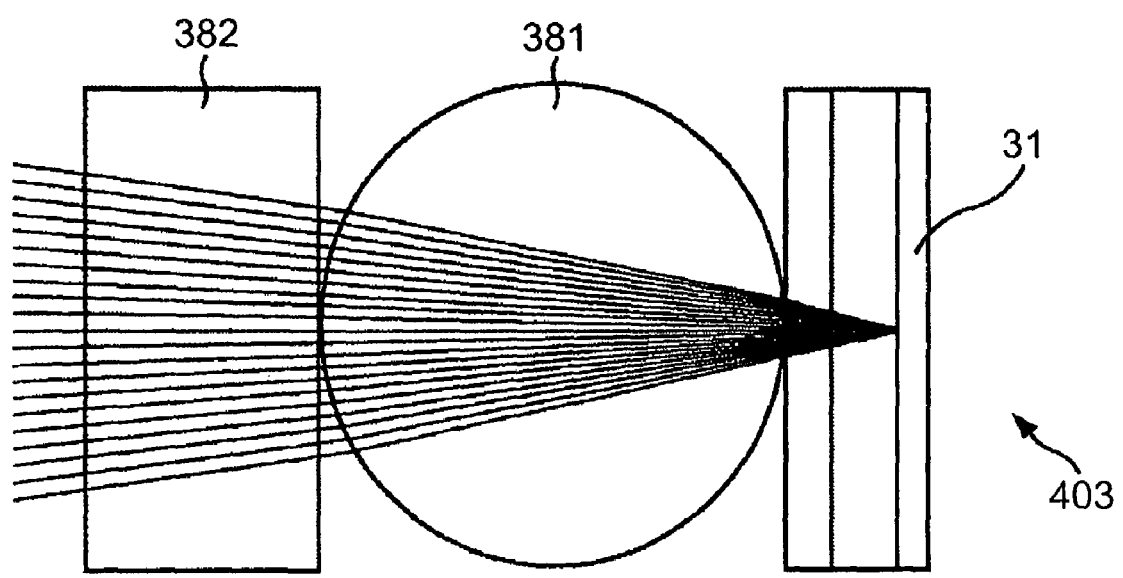
FIG. 21 is a sectional view of the structure of an image display apparatus according to another modification, the distance between each lens and the display surface of a display unit in the image display apparatus being adjusted.

FIG. 20 shows the structure of an image display apparatus 402 according to another modification. In the image display apparatus 402, the display surface of a display unit 31 is closer to a lens 381 than the position of the display surface of the image display apparatus 401 of FIG. 19. Therefore, light rays of an image displayed in the display unit 31 are slightly diverged but released as substantially parallel rays from the lens 381. FIG. 21 shows the structure of an image display apparatus 403 according to another modification. In the image display apparatus 403, the display surface of a display unit 31 is closer to a lens 381 than the position of the display surface of the image display apparatus 402 of FIG. 20. Therefore, the degree of divergence becomes larger than that in FIG. 20.

As shown in FIG. 19, collimating light rays through the lens 381 allows the user to visually recognize the light rays as those coming from infinity. As the lens 381 is closer to the display surface of the display unit 31 as shown in FIGS. 20 and 21, the optical distance to a virtual image plane becomes shorter, thus allowing the user to visually recognize a virtual image such that the image exists in the vicinity of the user, i.e., to recognize a larger virtual image at the reduced distance than that of FIG. 19. As for light rays observed by the user, when light rays are close to parallel rays, the light rays are close to rays coming from infinity. Thus, user fatigue can be reduced. When the distance between the lens 381 and the display surface of the display unit 31 is controlled so as to suit the eyesight of each user, proper images can be provided to the user.

In the case of displaying a stereoscopic image, i.e., allowing the user to visually recognize a stereoscopic image, an image obtained by shooting a subject at a reference position (center position) is displayed in the display area 42A in substantially the center position. Images having the amounts and directions of parallax different depending on the distance and direction from the center are displayed in the display areas 42A around the center display area 42A.

For example, referring to FIG. 4, the right display area 42A next to the center display area 42A displays an image captured by a camera spaced at a unit distance (e.g., 1 cm) from a reference position on the right side as viewed from a subject (i.e., on the left as viewed to the subject). The rightmost display area 42A in the same row as the center display area 42A displays an image captured by another camera spaced at a distance (of 3 cm in this case) of three times of the unit distance from the reference position on the right side as viewed from the subject (i.e., on the left as viewed to the subject).

Similarly, in FIG. 4, the left display area 42A next to the center display area 42A displays an image captured by another camera spaced at the unit distance (1 cm) from the reference position on the left side as viewed from the subject (i.e., on the right as viewed to the subject). The leftmost display area 42A in the same row as the center display area 42A displays an image captured by another camera spaced at a distance (3 cm) of three times of the unit distance from the reference position on the left side as viewed from the subject (i.e., on the right as viewed to the subject).

The same applies to the relationship between cameras and the display areas 42A in the longitudinal direction. In other words, the upper display area 42A on the center display area 42A displays an image captured by another camera spaced at the unit distance (1 cm) from the reference position on the upper side. The uppermost display area 42A in the same column as the center display area 42A displays an image captured by another camera spaced at a distance of three times of the unit distance from the reference position on the upper side.

Similarly, in FIG. 4, the lower display area 42A under the center display area 42A displays an image captured by another camera spaced at the unit distance (1 cm) from the reference position on the lower side. The lowermost display area 42A in the same column as the center display area 42A displays an image captured by another camera spaced at a distance (3 cm) of three times of the unit distance from the reference position on the lower side.

Figure 22:
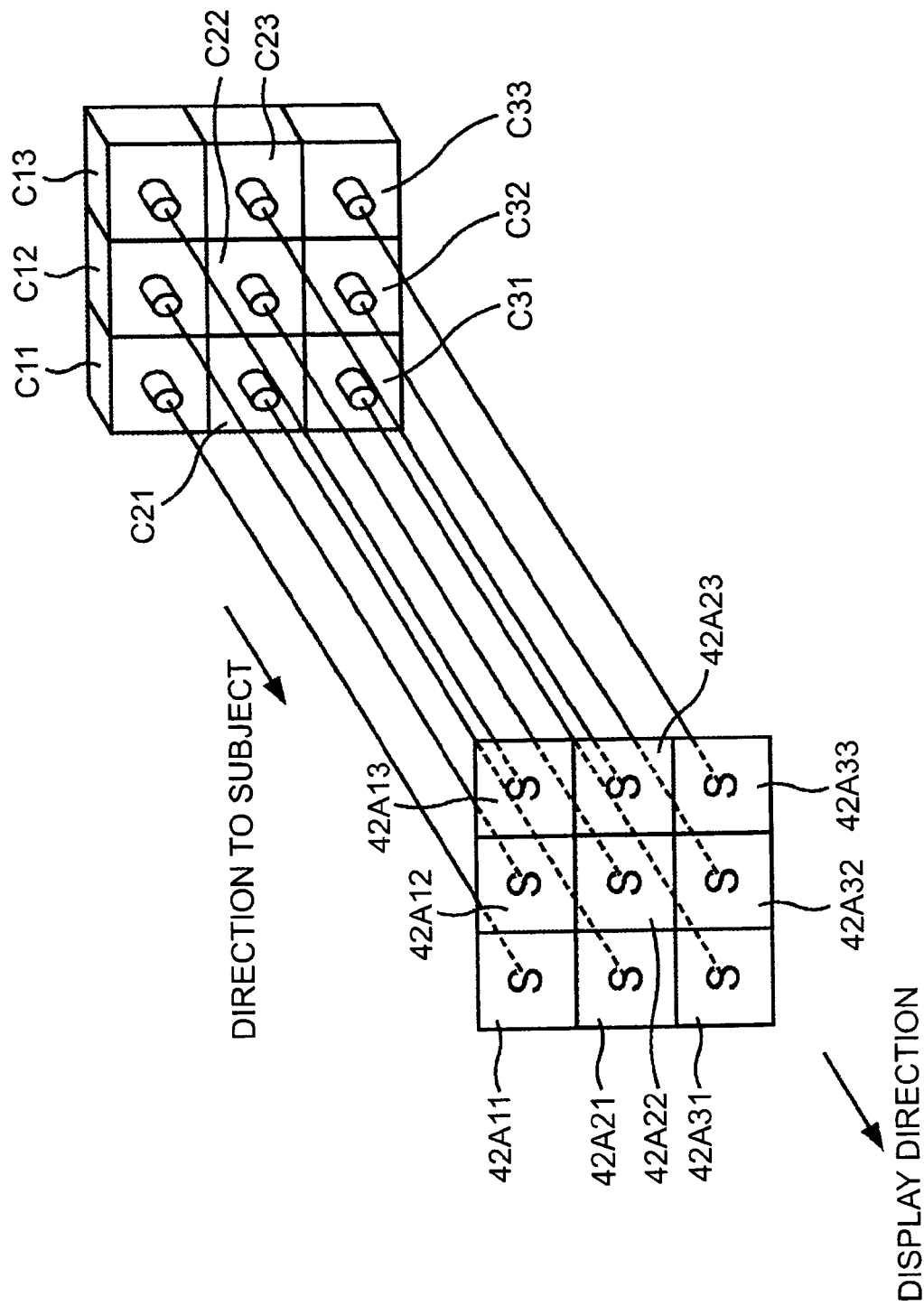
FIG. 22 is a diagram explaining images displayed in respective display areas to display a stereoscopic image.

In other words, as shown in FIG. 22, m×n (in this case, 3×3) cameras C11 to C33 arranged in a matrix with a pitch (unit distance) of 1 cm capture 3×3 images of a subject. The 3×3 images are respectively displayed in 3×3 display areas 42A11 to 42A33 in the corresponding positions (on condition that the direction to the subject of each camera is identical to the display direction of a display element).

It should be understood by those skilled in the art that various modifications, combinations, sub-combinations and alterations may occur depending on design requirements and other factors insofar as they are within the scope of the appended claims or the equivalents thereof.

The invention claimed is:

1. An image display apparatus attachable to an eyeball, the apparatus comprising:
   a display unit including a plurality of display areas for displaying images, the display areas being arranged on a curved surface;
   a lens array unit integrated with the display unit, the lens array unit having lenses corresponding to the respective display areas, each lens allowing light rays of an image in the corresponding display area to pass through;
   a lubricating member formed on the display unit such that the lubricating member and the lens array unit are arranged on opposite sides of the display unit, the lubricating member permitting eyelids in contact with the image display apparatus to smoothly move; and
   a protecting member formed on the lens array unit such that the protecting member and the display unit are arranged on opposite sides of the lens array unit, the protecting member being made of a light-transmissive material for protecting the eyeball in contact with the image display apparatus.

2. The apparatus according to claim 1, further comprising: an output unit for outputting image signals received by radio or through a human body to the display areas.

3. The apparatus according to claim 2, wherein the output unit is arranged in the periphery of the display unit.

4. The apparatus according to claim 3, wherein the output unit is arranged in the periphery of the display unit such that the output unit is located outside the outer diameter of the pupil of the eyeball of an assumed user.

5. The apparatus according to claim 2, wherein the output unit outputs image signals to the plurality of display areas to display the same images or images with parallax.

6. The apparatus according to claim 1, wherein the display unit transmits external light rays while displaying no images.

7. The apparatus according to claim 1, wherein the plurality of lenses include substantially spherical lenses that are arranged on part of the curved surface so as to correspond to the respective display areas and are held in tight contact with each other.

8. A method for displaying images on an image display apparatus including a display unit having a plurality of display areas integrally formed and arranged on a curved surface and a lens array unit integrated with the display unit, the lens array unit having lenses arranged so as to correspond to the respective display areas, the image display apparatus being attachable to an eyeball of a user, the method comprising the steps of:
   displaying images in the display areas; and
   applying light rays of the image in each display area through the corresponding lens to the eyeball.

9. An image display apparatus attachable to an eyeball, the apparatus comprising:
   display means including a plurality of display areas for displaying images, the display areas being arranged on a curved surface;
   lens array means integrated with the display means, the lens array means having lenses corresponding to the respective display areas, each lens allowing light rays of an image in the corresponding display area to pass through;
   lubricating means formed on the display means such that the lubricating means and the lens array means are arranged on opposite sides of the display means, the lubricating means permitting eyelids in contact with the image display apparatus to smoothly move; and
   protecting means formed on the lens array means such that the protecting means and the display means are arranged on opposite sides of the lens array means, the protecting means being made of a light-transmissive material for protecting the eyeball in contact with the image display apparatus.

* * * * *